May 25, 1965 C. P. KNIGHT 3,184,868
PUSHER TYPE CARRIER SCRAPER
Filed March 18, 1963 4 Sheets-Sheet 1
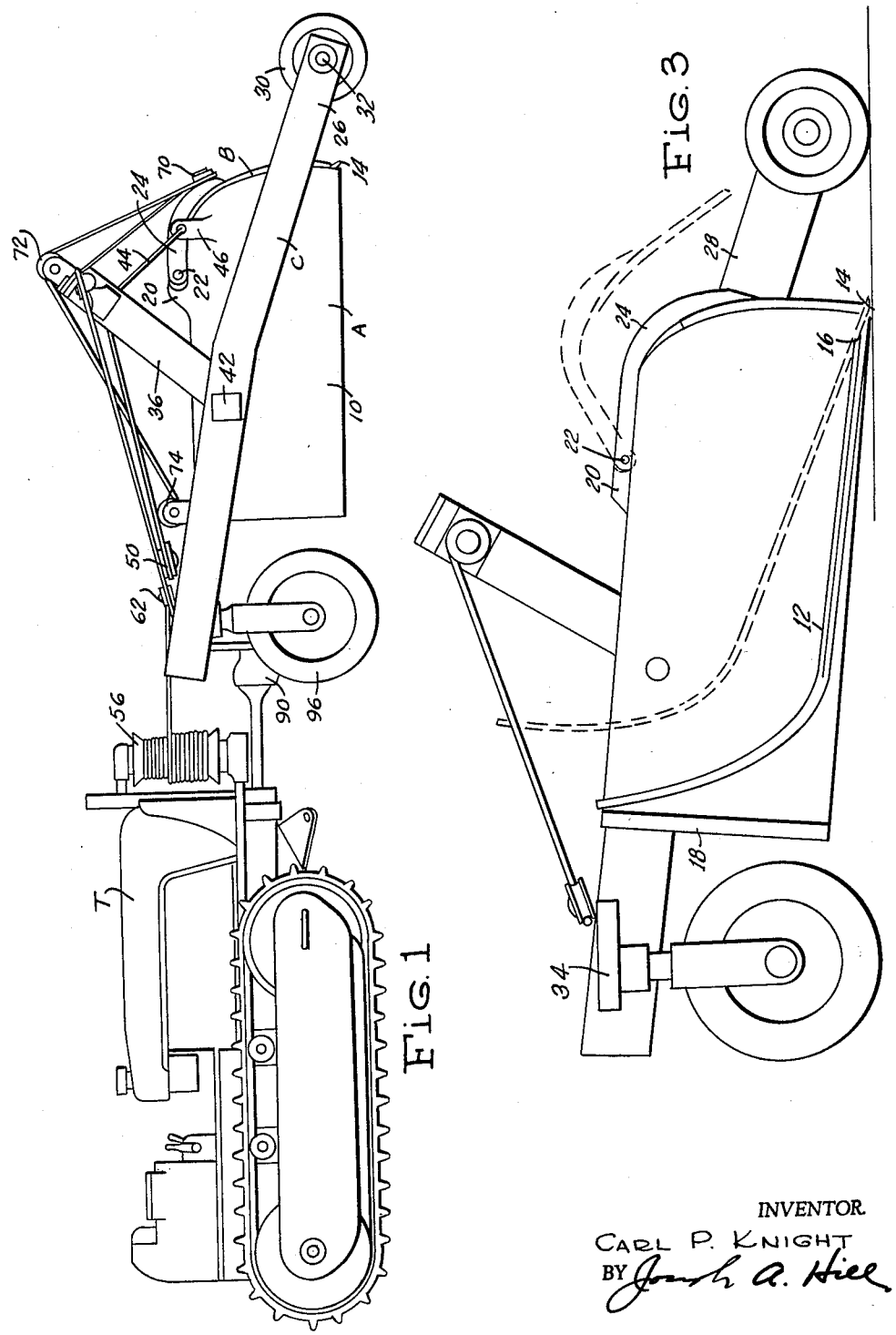
INVENTOR.
CARL P. KNIGHT
BY Joseph A. Hill
ATTORNEY May 25, 1965 C. P. KNIGHT 3,184,868
PUSHER TYPE CARRIER SCRAPER
Filed March 18, 1963 4 Sheets-Sheet 2

INVENTOR.
CARL P. KNIGHT
BY
ATTORNEY.

May 25, 1965 C. P. KNIGHT 3,184,868
PUSHER TYPE CARRIER SCRAPER
Filed March 18, 1963 4 Sheets-Sheet 3

INVENTOR.
CARL P. KNIGHT
BY
ATTORNEY

May 25, 1965 C. P. KNIGHT 3,184,868
PUSHER TYPE CARRIER SCRAPER
Filed March 18, 1963 4 Sheets-Sheet 4

INVENTOR.
CARL P. KNIGHT
BY Joseph A. Hill
ATTORNEY

United States Patent Office 3,184,868
Patented May 25, 1965

3,184,868
PUSHER TYPE CARRIER SCRAPER
Carl P. Knight, 407 N. Service Drive, Alexandria, Va.
Filed Mar. 18, 1963, Ser. No. 266,108
10 Claims. (Cl. 37—126)
(Granted under Title 35, U.S. Code (1952), sec. 266)

The invention described herein may be manufactured and used by or for the Government for governmental purposes without the payment to me of any royalty thereon.

This application is a continuation-in-part to application Serial No. 40,466, filed July 1, 1960, now U.S. Patent Number 3,083,479, dated April 2, 1963.

This invention relates to a new and useful improvement in earth movers or carrier scrapers of the type used for earth digging, carrying and filling operations.

Earth moving machines of the type described generally make use of a main bowl having a forward cutting blade mounted on a wheeled frame. The main frame is pivoted at its front end to the rear of a tractor which pulls the carrier scraper during its work cycle.

In the machine of my invention a radical departure from the usual mode of operation is achieved. The tractor of my invention is used to push the carrier scraper during its work cycle. The main bowl is mounted on a wheeled frame having a forward cutting blade. The wheeled frame is attached at its rear end to the front of a tractor for pushing the earth mover in the digging operation and after the carrier scraper is loaded continues to push the carrier scraper toward the site at which the bowl is to eject its load.

It has long been the desire of earth moving to cut costs of operation by reducing the required travel of the scrapers from the excavating or loading site to the unloading site. Moreover, as happens often times in earth excavation, an earth scraper will not be able to turn around at the area being excavated but will have to travel a greater distance to a cul-de-sac or turn around place.

Also, in excavation it is common practice today, in order to obtain a full load, to utilize a pusher tractor for pushing the carrier scraper as it excavates the earth. Thus resulting in added expense by tying up a machine and man to a job that often totals many hours of doing nothing while waiting for a scraper carrier to arrive at the excavating site.

My invention has been made with the foregoing considerations in mind and has many important objectives in its creation and use.

An important object of my invention is the provision of an earth scraper which can be propelled to a site to be excavated, pushed into the earth to obtain a full load and then either pushed forwardly to the unloading site or pulled thereto.

Another important object of my invention is the use of the principal of weight transfer to obtain a larger load in loading a carrier scraper without the use of a pushing tractor.

Another important object of my invention is to provide a carrier scraper which can more economically operate in earth moving operations than conventional carrier scrapers in use today.

Another important object of my invention is to provide a carrier scraper which will reduce materially the distance required to travel between the loading site and the unloading site, by eliminating need for turnaround.

Other features and advantages not specifically enumerated will become apparent after a consideration of the following descriptions and the appended claims.

In the drawings, which represent a preferred embodiment of my invention:

FIGURE 1 is a side elevational view of the carrier scraper of my invention shown attached to the propelling tractor.

FIGURE 3 is a sectional view of the carrier scraper of my invention taken on the line 3—3 of FIGURE 2.

Figure 8:
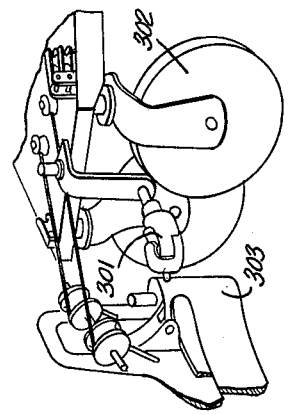
FIGURE 8 depicts still another embodiment of my invention incorporating certain aspects of both the first and second embodiments.

Referring now to FIGURE 1 wherein the carrier scraper consists generally of a main bowl A, a front apron B and a main frame C. As in FIGURE 3, the main bowl consists of the side walls 10, a hinged bottom 12 and the inclined digging blade 14. The hinged bottom 12 extends between the side walls and has a pivotal connection 16 with the mounting of the digging blade. The digging blade extends between and is rigidly connected to the lower forward portion of the side walls. The sides of the bowl are connected at its rear end by the wall 18. In FIGURE 3, the hinged bottom is shown in the normal carry or excavating position in the solid line and in the partly raised discharge position in the dotted line.

Spaced beams (not shown) rigidly interconnect the side walls of the bowl. The exact formation of the bowl does not form a part of my invention and is therefore not described in greater detail.

Upstanding projections 20 are formed on the side walls of the bowl at the upper portion thereof intermediate the ends, to which is pivoted at 22 the arms 24 of the apron. Thus the apron may be swung between raised and lowered closed positions relative to the digging blade 14.

The main frame C consists of two side box beams 26 and 28 which are pivotally connected to the front wheels 30 by stub axles 32 inwardly arranged on the front extremities of the beams 26 and 28. The rearward ends of the box beams are connected together in a rigid structure by the beam 34. Beams 36 and 38, rigidly attached to the box beams 26 and 28 respectively, extend upwardly therefrom at an angle at a point intermediate the ends of the box beams. A beam 40 rigidly connects the upper ends of the beams 36 and 38.

Figure 2:
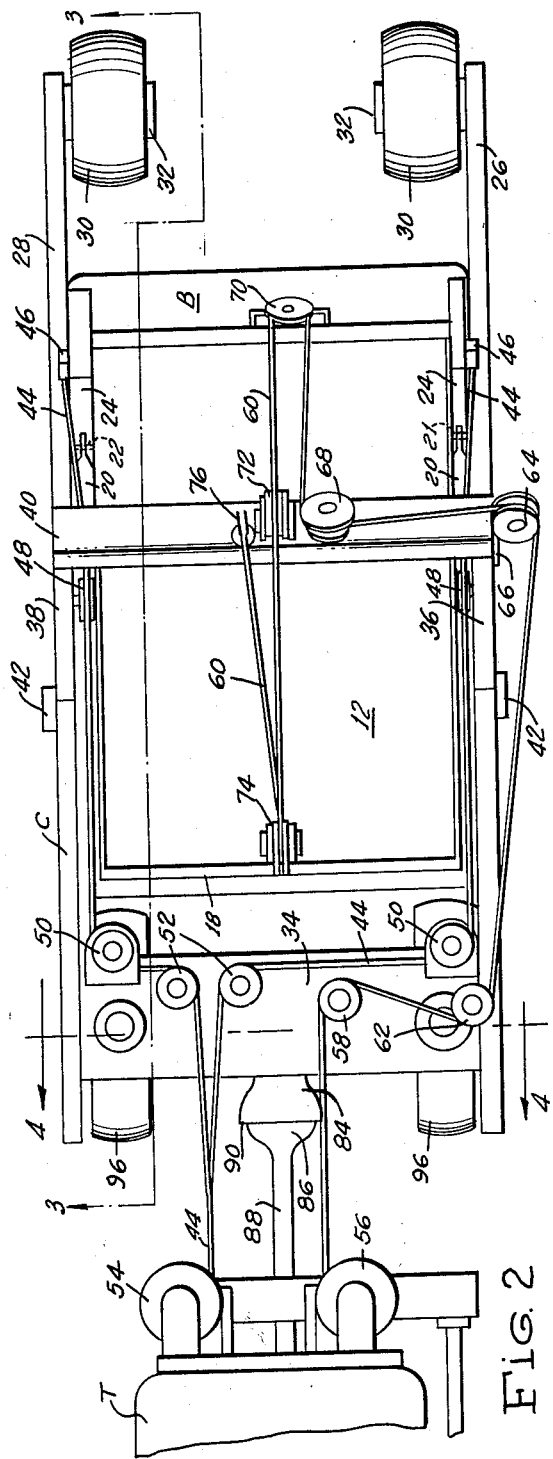
FIGURE 2 is a top plan view of the carrier scraper of FIGURE 1.
Figure 4:
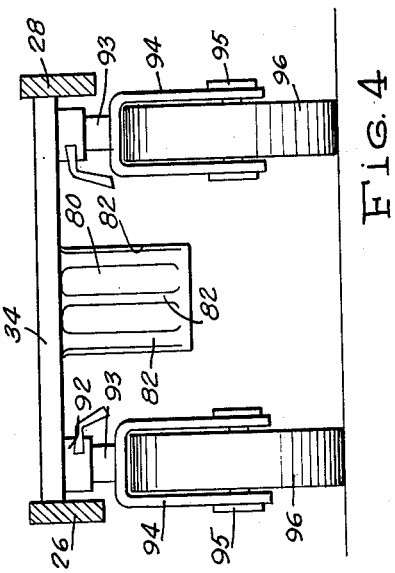
FIGURE 4 is a sectional view of the rear portion of the carrier scraper of my invention taken on the lines 4—4 of FIGURE 2.

FIGURE 1, as well as FIGURE 2 shows the bowl A pivotally attached to the main frame by pivot pins 42 provided on the main frame at a point adjacent the attachment of the beams 36 and 38. In this respect it is to be noted that the bowl is pivoted at a point closer to its rear end than the front thereof in order to provide a proper normal overbalance in the forward end. The forward end is the end which moves toward the material to be loaded.

The bowl can be raised and lowered about the axis of the pivot pins 42 by means of the cables 44. Formed on the upper front portion of each side wall 10 is an upstanding lug 46. The cable 44 is fixed at one end to the lug 46. Extending from lug 46 the cable 44 is passed over a sheave 48 mounted on the upper inner side of beams 36 and 38, then is passed around a sheave 50 mounted on an end of the beam 34, then is passed around a fairlead sheave 52 mounted on an intermediate portion of the beam 34. Thence it passes to a winch 54 which is operated from the power take-off of tractor T.

Cable 60 controls the function of apron lifting and dumping. It passes from the winch 56, which is also operated from the power take-off of the tractor, around the fairlead sheave 58 mounted on the beam 34, around the sheave 62 mounted adjacent the rear end of the beam 26, over the sheave 64 mounted on the beam 40 by a sheave bracket 66, around a sheave 68 mounted on the beam 40 centrally thereof, and under a sheave 70 mounted on the central portion of the apron. Thence over a sheave 72 mounted centrally on the beam 40 adjacent sheave 68, over a sheave 74 extending upwardly at the top central portion of the bowl bottom 12, to an anchorage 76 on the beam 40 adjacent the sheave 72. The result of this reeving is that when the cable 60 is drawn in, sheaves 68 and 70 will first be drawn together to thus raise the apron B a short distance. By continuing to draw in on cable 60 with apron B at the upper limit of its travel, sheaves 74 and 72 will then be drawn together to raise the bottom 12 about the pivot 16.

Depending from the beam 34 is a push plate 80. Brace plates 82 are rigidly attached to beam 34 and the forward face of the push plate 80. A female coupling 84 of a ball and socket joint 90 is rigidly attached to the rearward face of the push plate 80. The male member 86 of the ball and socket joint is carried by a thrust arm 88 extending outwardly from and rigidly carried by the front structure of the tractor.

Rigidly attached to the bottom of beam 34 at each side thereof adjacent the beams 26 and 28 is a hydraulic cylinder 92, a ram 93 extends downwardly from each cylinder and has fixedly attached thereto at the lower portion a U-shaped yoke 94. A castor wheel suspension means 96 is mounted in the yoke by means of axle 95 carried thereby. The ram 93 is arranged to rotate in the cylinder 92.

The hydraulic cylinders 92 are operated by a conventional system (not shown) through the tractor power take-off.

Figure 5:
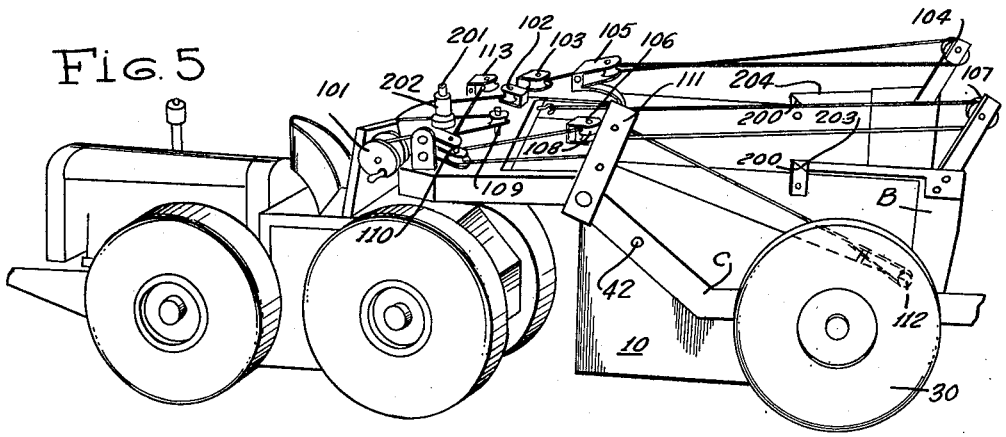
FIGURE 5 is a perspective view of a second embodiment of my invention.
Figure 6:
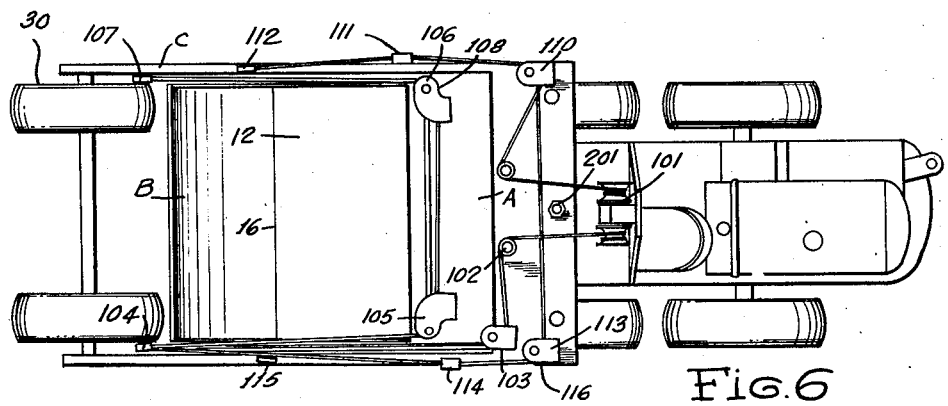
FIGURE 6 is a plan view of another embodiment showing the carrier scraper in a scraping position.
Figure 7:
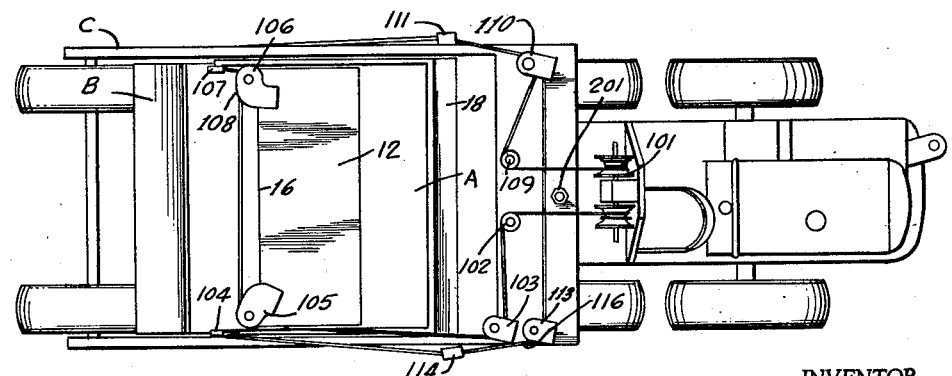
FIGURE 7 is a plan view of the embodiment of FIGURE 6 showing the carrier scraper in an unloading position.

Referring now in detail to FIGURES 5–7, the primary elements of the carrier scraper itself (not including controls and tractor couplings) are labeled as in FIGURES 1–4. This embodiment differs from my first embodiment primarily in the utilization of a different type of connection between the prime mover and the carrier scraper; and in an alternate cable and sheave arrangement to adjust main bowl A, to raise and lower apron B, and to raise and lower hinged bottom 12. This embodiment differs from FIGURES 1 through 4 principally in that the top of bowl A is open for loading from above.

As can thus be seen in FIGURE 5, the prime mover is connected to the pusher carrier scraper by means of vertical axle 201 rigidly affixed to the frame of the prime mover and vertical shaft 202, rigidly affixed to the rear portion of the carrier scraper, riding on axle 201.

This embodiment utilizes a set of controls which eliminates beams 36 and 38 as well as cross beam 40 of FIGURES 1–4. Apron, bottom and bucket action are all controlled by cables turning on dual-control winch 101 which is operated from and mounted on the prime mover.

Apron B and hinged bottom 12 are controlled for action as described above with respect to the first embodiment by a cable running from winch 101 through fair lead sheaves 102 and 103, through sheave 104 which is mounted on apron B, through sheave 105 which is mounted at the top of hinged bottom 12, through sheave 106 also mounted at the top of hinged bottom 12, through sheave 107 mounted at top of apron B, to a securing point 108 at the top of hinged bottom 12.

While the operation of apron B and hinged bottom 12 is nearly identical in this embodiment to that of FIGURES 1–4, the opening movement of apron B is limited in this embodiment by stops 200 on hinges 203 and 204 so disposed as to prevent the apron from raising further than is necessary for normal operation. When the apron is stopped in its opening motion, the continued pull on the cable causes hinged bottom 12 to rotate on its hinges 16 and move upward toward the emptying position which is illustrated by FIGURE 7. When the cable is slackened, the weight of hinged bottom 12 causes it to fall into its working position (a spring or other appropriate means may be used to insure the rapid return of the bottom); and a further slackening of the cable causes apron B to lower to the desired position.

The adjustment of the bucket with the blade is also controlled from winch 101. A second cable extends from the winch around fair lead sheave 109 through one pulley of double sheave 110, over one pulley of double sheave 111, around sheave 112 which is mounted on side 10, through a second pulley on double sheave 111, through a second pulley of double sheave 110, around fair lead sheave 113, over fair lead sheave 114, around sheave 115 mounted on the opposite side of the main bowl from sheave 112 and back through double sheave 114 to its secured end at 116. Thus bowl A can be raised and lowered about the axis of pivot pins 42, in a manner somewhat similar to the control of bowl A in the embodiment of FIGURES 1–4.

FIGURE 8 shows an embodiment similar to that described in FIGURES 5–7 except that the rear of the carrier-scraper is supported by castor wheels 302 and the connection with the prime mover is a universal coupling 301, somewhat similar to that of the first embodiment illustrated. With the coupling attached to a hydraulic ram pusher plate 303 of the tractor, the front of the carrier scraper can be raised or lowered as desired.

Figure 9:
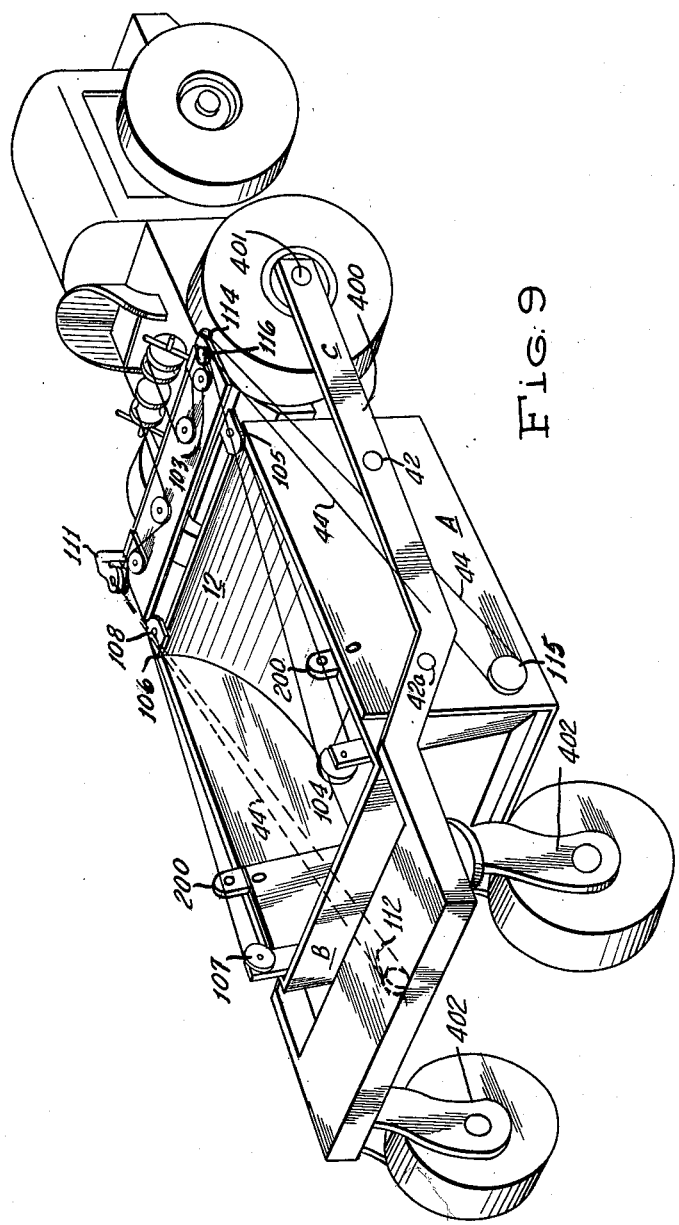
FIGURE 9 is a perspective view of a fourth embodiment of my invention.

FIGURE 9 depicts still another embodiment of this invention where the frame of the carrier scraper is securely affixed to the frame of the front of the prime mover so that when the prime mover turns, such as by applying brakes to selected ones of the independently powered wheels thereof, it turns the carrier scraper which has forward castor wheels 402. The frame 400 of a carrier scraper may be affixed to the axles 401 of the prime mover and/or secured directly to the front of the frame of prime mover or on trunnions between the wheels on each side of the prime mover. In other respects this fourth embodiment is the same as that described in FIGURES 5–7.

The operation of my machine is as follows: The operator of the tractor travels to the site being excavated by either travelling rearwardly with the tractor and thus pulling the carrier scraper, or by travelling in a forward direction with respect to the tractor and thus pushing the carrier scraper. Obviously the material being excavated can then be carried loaded to the site of unloading by either method of travel. When pulling the carrier scraper the arm 88 (FIGURES 1–4) acts as a draft bar as the tractor travels rearwardly.

Assume, however, that the tractor is moving forwardly pushing the carrier scraper to load the bowl. In such operation the operator advances the tractor in a forward direction moving against the thrust bar 88 (FIGURES 1–4) or illustrated equivalent, the carrier scraper is lowered to take a cut by controlled release of the cable 44.

As the scraper is advanced, the opposite reaction of force against the thrust of the tractor will cause a transfer of weight of the bowl back to the tractor. Manipulation of cylinder 92 (FIGURES 1–4) will cause the caster wheels 96 to rise off the ground by this reaction. Raising or lowering the wheels will control the extent of weight transfer back to the tractor.

As thus will appear obvious, the weight transferred back to the tractor is thus used to obtain a better traction and to permit the operation of the carrier scraper to obtain a load without requiring the use of a pusher tractor. As will also appear obvious, the bowl when it is unloaded can also be used to transfer its weight back to the tractor for better traction by activating the cylinders 92 to raise the caster wheels and thus permit part of the weight of the carrier scraper to add to the traction of the prime mover.

If in the forward travel the carrier scraper, while loaded or while being loaded, is caused to veer either to the right or to the left, the operator will by the control of the tractor compensate for such undesired movement by changing the direction of movement of the tractor to overcome the change of direction of the carrier scraper.

The invention of this disclosure is seen to comprise a frame unit, a bowl unit, and mobile means and control means for dumping the bowl. The embodiments disclosed reveal several of the arrangements of these elements in operative species. The basic operation of the raising of an apron in the bowl unit to its upper limits followed by the raising of a hinged bottom in the bowl when dumping is required is accomplished by having the bowl structure practically identical in all of the species and the arrangement of the elements of the combination requiring minor modification to be adapted for many uses. The device as shown in FIGURES 5 through 7 has the frame member pivoted to the prime mover with the wheels of the scraper unit being moved away from the pivoted end. The wheels 30 can be mounted along the sides as shown in FIGURE 5 or can be placed at the end of the scraping unit as shown in FIGURES 6 and 7. These arrangements provide for turning of the system in the pivot means and in the normal turning function of the prime mover. The species as shown in FIGURE 8 has the frame turned as in FIGURE 5 and differs therefrom in that the pivoted connection is accomplished at a lower level on the prime mover and in that casters 302 carry the scraper load instead of the prime mover.

The species shown in FIGURE 9 has the frame C reversed from that of FIGURES 5 through 8 with the casters 402 on the end away from the prime mover and the turning of the system is accomplished by the normal turning means of the prime mover and the mobility provided by casters 402. The control system for the species shown in FIGURES 5 through 9 is essentially the same. Where the structure of FIGURE 5 requires the presence of several sheaves and accompanying support structure therefor to provide the motion required for operation of the bowl structure, the modification shown in FIGURE 9 reveals a somewhat simplified control arrangement whereby the operator of the prime mover can operate the bowl structure. In FIGURE 9 the pivot pin hole 42a is included to show the adaptability of the structure to rearrangement for the need demanded. That is, the bowl A can be lifted out by the removal of pivot pins 42, and the frame C can be reversed, the casters 402 removed and wheels 30 placed at the location of axle 401, to accomplish a modification similar to the one shown in FIGURE 6. For loading purposes, apron B is raised and the bowl A is lowered so that the cutting edge 14 is properly elevated. The prime mover moves the scraper until the hinged bottom 12 fills. The apron is then lowered to secure the load. The bowl A is raised by cable 44 to the transport position. Cable 44 can be controlled to raise the scraper edge 14 the correct height for delivery of the carried material as well as the correct height for scraping. When the bowl A is to be emptied, the apron B is raised to its upper limit followed by the raising of the hinged bottom 12 to a level necessary for emptying the bowl.

It is seen that I have provided a new and useful scraper device wherein the lost time motions in operation are reduced to a minimum, a scraper which is capable of being modified for specific need, and a series of standard elements which can provide full utility of the scraper.

Other modifications and variations of the present invention will occur to those skilled in the art after a careful study of the invention which I have disclosed. For example, a two-wheeled tractor could be utilized in place of the endless type crawler or four wheel tractor shown in the drawings. All such modifications and variations which come within the spirit and scope of the present invention are intended to be included herein as fully and completely as if they had been specifically illustrated, described and claimed.

I claim:

1. In combination, a prime mover and a pusher type carrier scraper comprising a frame, a bowl pivotally mounted on said frame and mounted on an axis transverse to said frame having a forward digging edge and a pair of substantially parallel sides, a bottom for said bowl, said digging edge having a hinge mounting edge, hinge means for pivotally mounting said bottom connected to said hinge mounting edge, a pivotally mounted closing apron having two ends one of which is adjacent one of said sides, connecting means between the rear of said prime mover and the rear of said scraper, suspension means for said frame, first controlled operating means connected to each of the ends of said apron and said hinged bottom for sequentially opening said apron and raising said bottom, second controlled operating means for positioning the height of said digging edge, said first and second controlled operating means being disposed substantially parallel and coplanar with said parallel sides whereby the bowl is open for top loading.

2. The combination in claim 1 wherein said first controlled operating means comprises a winch mounted on said prime mover, a cable having two ends one of which is connected to said winch, said cable extending from said winch successively through a plurality of sheaves which direct said cable in the vicinity of the top of said sides to a first pair of sheaves on opposite ends of said apron, said cable directed through a second pair of sheaves on opposite ends of the top of said hinged bottom between said first pair of sheaves and said second cable end secured to one of said second pair of sheaves.

3. The combination in claim 1 wherein said independent suspension means for said frame includes castor wheels mounted at the opposite end of the frame from its connection to the prime mover.

4. The combination in claim 1 wherein said connecting means between the rear of said prime mover and the rear of said carrier scraper comprises a vertically mounted axle mounted on the rear of said prime mover and a shaft mounted on the rear of said prime mover and turning on said vertically mounted axle.

5. The combination of claim 4 wherein said suspension means comprises a pair of wheels mounted on the outside of said frame with the wheels extending approximately to the front of said bowl.

6. The combination of claim 4 wherein said suspension means comprises a pair of wheels mounted on the inside of said frame in front of said bowl.

7. The combination in claim 1 wherein said connecting means comprises a universal coupling with two ends and first means for securing one of said ends to said prime mover and second means for securing the other of said ends to said scraper.

8. The combination of claim 1 wherein said connecting means comprises means for pivotally securing said frame to the prime mover by securing means positioned on the chassis of said prime mover.

9. The combination of claim 1 wherein said connecting means comprises means for securing said frame to the axle of the rear wheels of said prime mover.

10. The combination of claim 9 wherein said suspension means comprises a pair of casters mounted in front of said bowl.

References Cited by the Examiner
UNITED STATES PATENTS

| | | |
|---|---|---|
| 1,233,839 | 7/17 | Burgess. |
| 1,516,619 | 11/24 | Pifer _____ 37—126 |
| 2,249,356 | 7/41 | Goodman _____ 37—126 |
| 2,347,882 | 5/44 | Choate _____ 37—126 |
| 2,529,159 | 11/50 | Hyler. |
| 2,669,043 | 2/54 | Reischl _____ 37—126 |
| 3,083,479 | 4/63 | Knight _____ 37—126 |

BENJAMIN HERSH, *Primary Examiner.*
CHARLES E. O'CONNELL, *Examiner.*